(12) United States Patent
Zagorsky et al.

(10) Patent No.: US 11,275,836 B2
(45) Date of Patent: Mar. 15, 2022

(54) SYSTEM AND METHOD OF DETERMINING A TRUST LEVEL OF A FILE

(71) Applicant: AO Kaspersky Lab, Moscow (RU)

(72) Inventors: Sergey G. Zagorsky, Moscow (RU); Dmitry V. Shvetsov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 147 days.

(21) Appl. No.: 16/669,798

(22) Filed: Oct. 31, 2019

(65) Prior Publication Data

US 2020/0410096 A1    Dec. 31, 2020

(30) Foreign Application Priority Data

Jun. 28, 2019   (RU) ............................ RU2019120220

(51) Int. Cl.
  *G06F 21/56*    (2013.01)
  *G06F 21/62*    (2013.01)
  *H04L 9/32*     (2006.01)
  *G06F 21/57*    (2013.01)

(52) U.S. Cl.
  CPC .......... *G06F 21/565* (2013.01); *G06F 21/564* (2013.01); *G06F 21/566* (2013.01); *G06F 21/577* (2013.01); *G06F 21/6218* (2013.01); *G06F 21/57* (2013.01); *H04L 9/321* (2013.01)

(58) Field of Classification Search
  CPC .... G06F 21/565; G06F 21/564; G06F 21/566; G06F 21/577; G06F 21/6218; G06F 21/56; G06F 21/57; G06F 21/62; G06F 21/51; H04L 9/32; H04L 9/321
  See application file for complete search history.

(56) References Cited

U.S. PATENT DOCUMENTS

| | | | | |
|---|---|---|---|---|
| 5,638,446 A | * | 6/1997 | Rubin | H04L 9/321 380/30 |
| 6,058,383 A | * | 5/2000 | Narasimhalu | G06F 21/51 705/39 |
| 7,640,589 B1 | | 12/2009 | Mashevsky et al. | |
| 8,146,151 B2 | * | 3/2012 | Hulten | G06F 21/51 726/16 |
| 8,650,649 B1 | | 2/2014 | Chen et al. | |

(Continued)

FOREIGN PATENT DOCUMENTS

EP        2169583 A1    3/2010

*Primary Examiner* — Jayesh M Jhaveri
(74) *Attorney, Agent, or Firm* — Arent Fox LLP; Michael Fainberg (57) ABSTRACT

Disclosed herein are systems and methods for determining trust levels of files on a computing device. In one aspect, an exemplary method comprises, selecting file names which are stable, generating at least one group of files from at least two files of the selected file names, the at least two files being components of a same application, searching for a presence of a dominant developer such that at least one private key of the dominant developer has been used to sign at least one file of the group of files that is generated, when a dominant developer is found, determining a trust level for all files of the group in accordance with verdicts associated with the dominant developer, and when the dominant developer is not found, determining the trust level for all the files of the group based on verdicts of outside services that have been assigned to the files of the group.

21 Claims, 4 Drawing Sheets

(56) References Cited

U.S. PATENT DOCUMENTS

| | | | |
|---|---|---|---|
| 2002/0023220 A1* | 2/2002 | Kaplan | H04L 63/0823 |
| | | | 713/176 |
| 2009/0083731 A1* | 3/2009 | Sobel | G06F 21/577 |
| | | | 717/177 |
| 2009/0217370 A1* | 8/2009 | Hulten | G06F 21/566 |
| | | | 726/16 |
| 2010/0077479 A1* | 3/2010 | Viljoen | G06F 21/56 |
| | | | 726/23 |
| 2013/0187599 A1 | 7/2013 | Ranga et al. | |
| 2014/0283065 A1* | 9/2014 | Teddy | H04L 67/34 |
| | | | 726/23 |

\* cited by examiner

SYSTEM AND METHOD OF DETERMINING A TRUST LEVEL OF A FILE

CROSS REFERENCE TO RELATED APPLICATIONS

The present application claims priority to Russian Patent Application No. 2019120220, filed on Jun. 28, 2019, the entire content of which is incorporated herein by reference.

FIELD OF TECHNOLOGY

The present disclosure relates to the field of computer security, more specifically to systems and methods for determining a trust level of a file, e.g., a file which is a component of an application stored on a computing device.

BACKGROUND

Computer information systems play an important role in modern society. At the same time, there is a sharp increase in the number of computer threats, which may include threats posed by various malicious applications (such as Internet worms, computer viruses, Trojan horse programs), as well as cyber attacks by hackers.

One approach for detection of malicious software is based on creating unique code signatures or behavior patterns, followed by searching for the signatures in a code of suspicious software. However, information about a new malicious software usually arrives at an antivirus company with some delay. Moreover, the updates containing signatures of new threats are sent out to computers of users of the antivirus products after a lengthy interval of time. As a result, a substantial time passes from the moment of appearance of a new malicious software to the moment at which the users obtain the updates for the signature databases of malicious software, such as to include the signatures of the new threats. Unfortunately, during the interval between the moment of appearance of the new malicious software and the moment of the update of the signature databases, a large number of computer devices of users may be infected.

Another approach for detection of malicious software involves using heuristic methods to analyze the code of an application and the emulation of its executable commands. Such heuristic methods, unlike signature methods, are suitable for the detection of new malicious software. However, these heuristic methods also have shortcomings. First, heuristic methods provide an inadequate level of detection. Second, they allow a large number of false positives, sometimes resulting in legitimate software being designated as malicious.

Due to the shortcomings of signature based and heuristic algorithm based approaches, protection mechanisms for computer systems that utilize cloud based services (e.g., reputation services) such as services provided by Kaspersky Security Network (KSN), have become popular. These cloud based protection mechanisms surpass the other approaches, described above, both in speed of response and in the level of protection. For instance, the cloud based reputation service are better at detecting new malicious software.

When using the cloud based approach, several reputation services may be employed simultaneously. These reputation services are stored on one or more remote servers of an antivirus company (in the present disclosure, for clarity, a remote server may be referred to as a cloud infrastructure). Such reputation services are based on an automatic gathering and processing of information arriving from the users. For instance, information about all attempts at infection and about unknown suspicious files which are downloaded and executed on user computing devices may be gathered and provided to the reputation services. The use of cloud reputation services allows an antivirus company to quickly respond to new threats and to reduce the number of false positives. After being received, the information collected from users is aggregated and analyzed in the reputation service of the antivirus company. A decision as to whether the software is safe or harmful is pronounced basis on many factors. For example, the factors may include one or more of: a presence of a digital signature (DS); a time of creation and a time of first detection of an application; a trust level (reputation) of the application and of its source, the trust level being determined based on a number of users of the reputation service who are using the application; and a geography of the use of the application indicative of physical locations of the users of the application.

It is noted that in addition to using the reputation services described above, the application may be further analyzed, for example, using detection capabilities of the antivirus company, and analysis capabilities of virus analysts (e.g., professionals with expertise in virus analysis). As a result of all of the above detection methods, a verdict is pronounced for the application in regards to a category of the application—that is, the most likely category is determined, e.g., malicious software, unwanted software, etc. Subsequently, the verdict is presented to all users of the reputation service who are either running this application on their respective computers, are downloading the application from a network, or both.

However, the use of the above cloud based technologies also has shortcomings. For example, all of the above methods fail at reducing and/or eliminating false positives. Furthermore, the above approaches fail to successfully classify a certain portion of trusted applications and files. For the analysis of files in the cloud infrastructure, most of the algorithms need to perform an analysis of the code of the file, but due to the large number of new or previously unknown files, the process of uploading the files to the cloud infrastructure and subsequently analyzing the codes of such a large number of files is difficult—if not impossible. In general, the most popular files (from among files used by various users of the cloud based reputation service) are the first files to be analyzed. Thus, the less frequently used files may continue to be delayed—thereby delaying the identification of a malicious application.

Moreover, in order to eliminate or reduce false positives of the protection system for new versions of known trusted applications, there is a need for a technology which allows the classification of the new versions of known trusted applications as being trusted software. Thus, the all of the methods described above have shortcomings in terms of the quality of classification, e.g., in classifying a trusted software. In other words, the approaches described above have shortcomings in regards to being effective, and in some cases, they are impossible to use.

Thus, there is a need for an effective way of providing computer security—thereby reducing the risk to data saved on computing devices of a user.

SUMMARY

Aspects of the disclosure relate to the field of information security, more specifically to systems and methods for determining a trust level of a file of an application.

In one exemplary aspect, a method for determining a trust level of a file of an application is implemented in a computer comprising a hardware processor, the method comprising: selecting file names which are stable, generating at least one group of files from at least two files of the selected file names, the at least two files being components of a same application, searching for a presence of a dominant developer such that at least one private key of the dominant developer has been used to sign at least one file of the group of files that is generated, when a dominant developer is found, determining a trust level for all files of the group in accordance with verdicts associated with the dominant developer, and when the dominant developer is not found, determining the trust level for all the files of the group based on verdicts of outside services that have been assigned to the files of the group.

According to one aspect of the disclosure, a system is provided for determining a trust level of a file of an application, the system comprising a hardware processor configured to: select file names which are stable, generate at least one group of files from at least two files of the selected file names, the at least two files being components of a same application, search for a presence of a dominant developer such that at least one private key of the dominant developer has been used to sign at least one file of the group of files that is generated, when a dominant developer is found, determine a trust level for all files of the group in accordance with verdicts associated with the dominant developer, and when the dominant developer is not found, determine the trust level for all the files of the group based on verdicts of outside services that have been assigned to the files of the group.

In one exemplary aspect, a non-transitory computer-readable medium is provided storing a set of instructions thereon for determining a trust level of a file of an application, wherein the set of instructions comprises instructions for: selecting file names which are stable, generating at least one group of files from at least two files of the selected file names, the at least two files being components of a same application, searching for a presence of a dominant developer such that at least one private key of the dominant developer has been used to sign at least one file of the group of files that is generated, when a dominant developer is found, determining a trust level for all files of the group in accordance with verdicts associated with the dominant developer, and when the dominant developer is not found, determining the trust level for all the files of the group based on verdicts of outside services that have been assigned to the files of the group.

In one aspect, the trust levels are determined in accordance with verdicts associated with the dominant developer based on: verdicts of outside services which have been assigned to the files of the group.

In one aspect, the trust levels are determined in accordance with verdicts associated with the dominant developer based on: verdicts of outside services which have been assigned to at least one file on a computing device of a user which does not belong to the group and is signed with the private key of the dominant developer.

In one aspect, the trust levels are determined in accordance with verdicts associated with the dominant developer based on: verdicts of outside services that have been assigned to files of another group of the dominant developer, the files of the another group having a run frequency among users that is greater than a predetermined threshold for a run frequency.

In one aspect, the outside services comprise at least one of: at least one protection system of at least one computing device on which the files are stored, and any number of servers of a cloud infrastructure with which the at least one computing device is communicatively coupled.

In one aspect, the cloud infrastructure aggregates and stores data received from all of the computing device, wherein data is collected by a protection system of a given computing device based on confidentiality settings selected by a user of the given computing device.

In one aspect, when the selected confidentiality settings indicates refraining from data collection, data on a local database of files of the computing device for which the refraining is selected includes information only on files having a predetermined characteristic, the predetermined characteristic including at least one of: the files being executable, the files being stored along a predetermined path, and the files having a predetermined set of extensions.

In one aspect, the method of the present disclosure determines a trust level of a file of an application while reducing false positives and while reducing the need for uploading large amount of files to cloud infrastructures and performing code analysis on all codes of the uploaded files. For instance, when new versions of known trusted applications are being analyzed for trustworthiness, the trust levels of files of the application are determined while reducing the number of false positives and the need for uploading large amounts of files to the cloud infrastructure. The method is designed to improve computer security. Thus, the method of the present disclosure advantageously enables information security of the data.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program for determining a trust level of a file of an application. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

At present, software developers use a cryptosystem with a public key to verify the integrity of files. The file is signed with the digital signature (DS) of the software developer. The DS and the public key certificate (also referred to as simply as a certificate in the present disclosure) confirming that the public key belongs to the software developer are kept together with the file. Knowing the public key of a trusted certification center (CC), the authenticity of the DS of the file may be easily verified.

The certificate, i.e., the public key certificate, has a limited lifetime, after the end of which the certificate needs to be replaced. One of the preliminary methods used by antivirus applications for identifying files having invalid digital signatures or revoked certificates is verification of the validity of the public key certificates of the digital signatures of files.

According to a cryptography standard X.509, a certificate contains the following fields:
  a serial number, used to identify the certificate;
  a subject, representing a party to whom the certificate was issued;
  a digital signature algorithm;
  the digital signature of the certificate;
  a certification center of the certificate;
  a lifetime of the certificate;
  a public key of the digital signature;
  a hash sum of the public key;
  a hashing algorithm of the public key.

In addition, the certificate may contain a "subject" field which identifies the developer of the file. A developer may have several different digital signatures for signing different respective files.

In order to present the teachings of the present disclosure with clarity, a number of terms and concepts, as used in describing various aspects of the disclosure, are defined herein.

A malicious application is an application able to cause harm to a computing system or to the data of a user of the computing system (in other words, a computer, a group of computers, personal computer, server, mobile telephone, and so forth), such as: an Internet worm, a keyboard logger, a computer virus. The harm caused may be unlawful access to the resources of the computer, including the data being kept on the computer, for the purpose of theft, as well as unlawful use of the resources, including for storage of data, performing computations, and so on.

A trusted application is an application which does not cause harm to a computing system or to a user of the computing system. A trusted application may comprise an application which has been developed by a trusted software manufacturer, downloaded from a trusted source (such as a site listed in a database of trusted sites), or an application whose identifier (or other data by which the application can be uniquely identified, for example, the hash value of the file of the application) is kept in a database of trusted applications. The identifier of the manufacturer, such as a digital certificate, may also be kept in the database of trusted applications.

An untrusted application is an application which is neither categorized as malicious nor as trusted. However, the untrusted application may later be categorized as malicious by antivirus applications. Moreover, the untrusted application may be one which contains vulnerabilities.

An intermediate application is an application which is neither malicious nor trusted, yet, which may execute an unwanted function, e.g., advertising function (adware). Intermediate application may also include a category or riskware—applications which are not malicious, yet which may be used by a hacker for malicious purposes (e.g., a remote administration application).

An unclassified application is an application not belonging to any of the aforementioned categories. Thus, an unclassified application is an application that does not belong to the categories of malicious, trusted, untrusted or intermediate applications.

A malicious file is a file which is a component of a malicious application, and contains a program code (e.g., an executable or interpreted code).

An untrusted file is a file which is a component of an untrusted application, and contains a program code (e.g., an executable or interpreted code).

A trusted file is a file which is a component of a trusted application.

An intermediate file is a file which is a component of an intermediate application.

An unclassified file is a file which is a component of an unclassified application.

Applications usually consist of many files stored in one or more directories of a computing device; certain information about the applications is also kept in a registry. Application files with identical names (such as "Chrome.exe") which are stored on different computing devices may differ, for example, in their hash sum. This is because different application versions might be installed on different computing devices. The different versions may contain different libraries and have different user settings. However, the majority of the application files are grouped along the same path, regardless of the software. At the same time, in order to hide malicious software, hackers often add malicious files to the directories of trusted software. However, the reputation services may not detect the new malicious software at once. It is noted that such reputation services are based on automatic collecting and processing of information from users. The information received from the users includes information in regards to attempts at infection, and information in regards to unknown suspicious files which are downloaded and executed on computers of the users. Therefore, there is a need for a technology which enables faster classification of files while reducing false positives, e.g., by properly classifying newer versions of trusted applications as trusted—thereby reducing the number of false positives.

In one aspect, the present disclosure describes a system for determining a trust level of a file of an application that is implemented on a computing system (e.g., a server, computer, etc.), that includes real-world devices, systems, components, and groups of components realized with the use of hardware such as integrated microcircuits (application-specific integrated circuits, ASICs) or field-programmable gate arrays (FPGAs) or, for example, in the form of a combination of software and hardware such as a microprocessor system and set of program instructions, and also on neurosynaptic chips. The functionality of such means of the system may be realized solely by hardware, and also in the form of a combination, where some of the functionality of the system means is realized by software, and some by hardware. In certain aspects, some or all of the components, systems, etc., may be executed on the processor of a general-purpose computer (such as the one shown in FIG. 4). Furthermore, the system components may be realized either within a single computing device or spread out among several interconnected computing devices.

Figure 1:
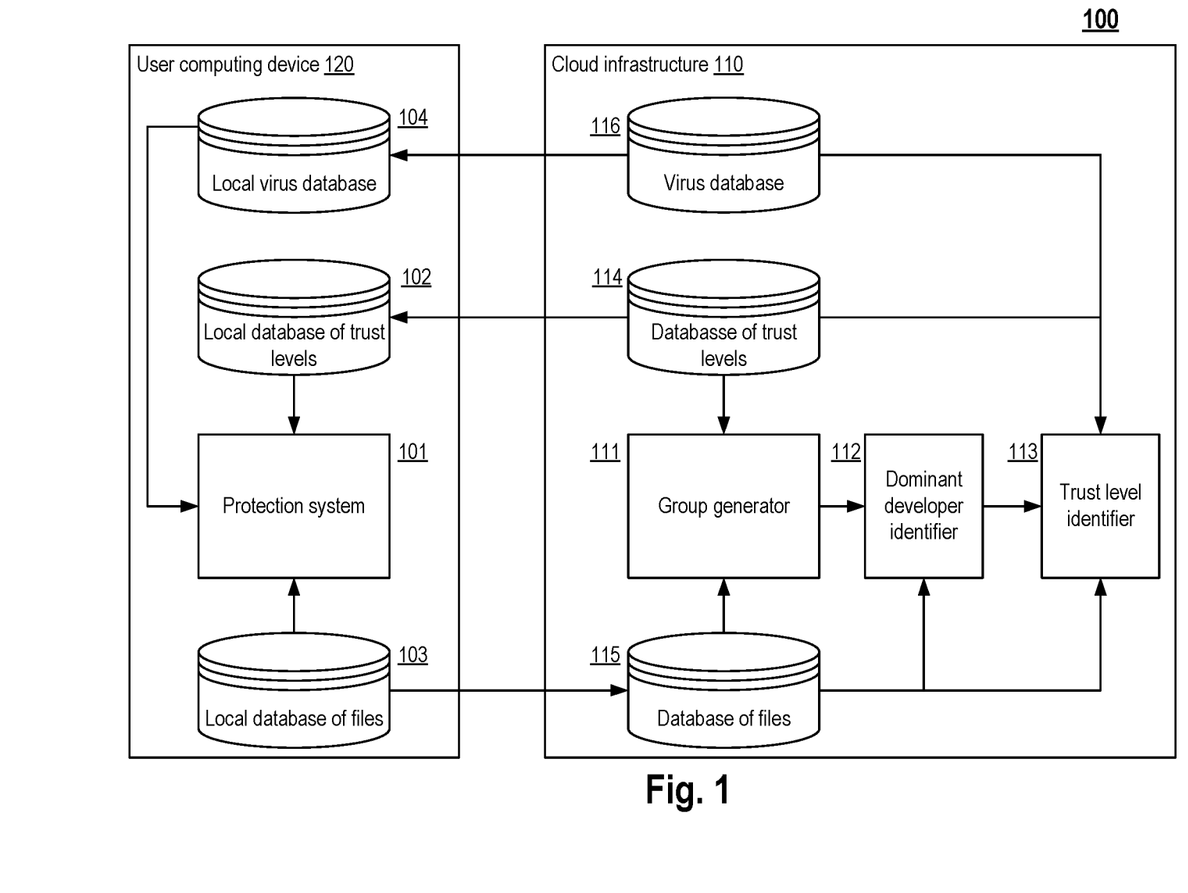
FIG. 1 illustrates an example diagram of a system for determining a trust level of a file of an application in accordance with aspect of the present disclosure.

FIG. 1 illustrates an example diagram of a system 100 for determining a trust level of a file of an application in accordance with aspect of the present disclosure.

The system 100 for determining a trust level of a file of an application comprises a cloud infrastructure 110 and any number of user computing devices 120.

A user computing device 120 may comprise a computer, tablet, notebook, smartphone, and so on. The user computing device 120 may include any number of: a protection system 101, a local database of trust levels 102, a local database of files 103, and a local virus database 104. The protection system 101 may comprise an antivirus application. In addition, the protection system 101 of the user computing device 120 may be connected to the local database of trust levels 102, the local database of files 103 of the computing device 120, and the local virus database 104.

The cloud infrastructure 110 is connected to the user computing devices 120, for example, via a local area network or the Internet. Moreover, the cloud infrastructure constitutes one or more remote servers and may be used by a developer of a protection system, e.g., a developer of the protection system 101 which is installed at least on two user computing devices 120. The cloud infrastructure 110 includes a group generator 111 that is used for generating a group of files, a dominant developer identifier 112, a trust level identifier 113, a database of trust levels 114, a database of files 115, and a virus database 116. The group generator 111 is connected to the dominant developer identifier 112, which is, in turn, connected to the trust level identifier 113.

The local database of files 103 contains information about the file system of the user computing devices 120, and on the files and applications the file system contains (e.g., the names, hash sums, the paths of the directories for files on the disk, the sizes of the files, the attributes and the meta-data, the digital signatures of the files, the public key certificates of the digital signatures of the files, the list and tree of directories, and so forth). The information about the file system may be obtained, for example, by reading records in a Master File Table (MFT). Furthermore, the local database of files 103 contains the verdicts of outside services—in particular, the verdicts by the protection system 101 and the cloud infrastructure 110 on files being verified. For example, the local database of files 103 may receive verdicts previously pronounced by the protection system 101 and its separate modules, and verdicts pronounced by the cloud infrastructure 110 and its separate modules. In addition, the local database of files 103 may receive statistics collected when the files run on the user computing devices 120. For instance, the statistics may include a number of times the files are run, a frequency of the files being run, and a number of times of starts. In a particular aspect, the verdicts of outside services and the statistics collected on files running on the computing device 120 may be contained in separate databases (such as on the virus database 116 of the cloud infrastructure 110 and on the local virus database 104 of the user computing device 120). For each user computing device 120, the data of the local database of files 103 is sent, by the respective protection system 101 of the user computing device 120, to the cloud infrastructure 110. The cloud infrastructure 110 aggregates and saves the data of the local database of files 103 received from all the user computing devices 120.

It is noted that the protection systems 101 which are located on different user computing devices 120 may collect different data. The data collected by a given protection system 101 of a particular computing device 120 depends on the confidentiality settings of the user of the particular computing device 120 and the settings of the protection system 101 on the particular computing device 120.

In one aspect, a user of the particular computing device 120 may select a setting for refraining from data collection. Thus, in one aspect, such data might not be gathered at all on certain user computing devices 120. When refraining from data collection is selected, the local database of files 103 contains information only on files having defined characteristics, such as information only on files which are executable. In yet another aspect, the local database of files 103 contains information only on files stored along certain paths (for example, % Program Files %, % AppData %). In yet another aspect, the local database of files 103 contains information about files with predetermined extensions, such as: '.dll', '.exe', '.vbs' or others.

In one aspect, the information contained in the local database of files 103 may be updated on command from the cloud infrastructure 110—for example, if the local database of files 103 initially contains only information about untrusted files, after further analysis (for example, by experts or additional modules of the cloud infrastructure), the list of files at the cloud infrastructure 110 may be expanded to include information about other types of files or other directories. When the information being gathered from the user computing devices 120 for storage in the local database of files 103 increases, the number of false positives may decrease and the quality of classification of trusted software may improve. Obviously, it is necessary to observe a balance in the number and type of data gathered on the file system, so as not to lower the performances of the user computing devices 120 and so as not to create an unacceptable computation load (processing) on the cloud infrastructure 110.

In one aspect, the group generator 111 is used for selecting the names of files stored on specified paths for specified portions of the computing devices 120 of the user (hereinafter, the stable file name). It should be noted that, in one aspect, all paths (on which all directories are stored) of the file system of the disk on a device of the user are considered.

In another aspect, only paths specified according to the settings of the user of the computing device 120 or the protection system 101 are analyzed. In one aspect, a file may be identified in the file system by the path of the file of at least one user of the file, by the file name, and by the hash sum of the file. In one aspect, the file name includes the full file name, which includes the path of the file together with the file name. In another aspect, the file name includes only the file name without the path (i.e., the file name is not a full file name).

It should also be noted that the path of a file may be specified by a regular expression or template, for example, in the Windows OS, by a unique system-independent identifier indicating the location of the directories often used by the applications—the CSIDL ("C:\Windows", "C:\Winnt" and others). Thus, if the directory Program files of the users are stored on different absolute paths (for example, C:\Program files and D:\Program files), for the method of the present disclosure, the absolute paths will correspond to a single path % Program files %.

Thus, for example, the file "Chrome.exe", which is an executable file of the Google Chrome application, may have different hash sums depending on the version of the application.

In one aspect, the file name is determined to be stable if, among all users having a previously indicated path on their respective devices, the occurrence of the file name for all devices of the users lies in a given vicinity of the file name most often encountered among all the devices of the users on the indicated path.

In one aspect, the occurrence of a file name denotes a portion of the users among whom the indicated file name is present, the portion being selected from among all the users for whom the indicated group is present. For example, 90% of the users have the file "Chrome.exe" in the directory "C:\Program Files (x86)\Google\Chrome\Application", together with other files of the Chrome application, such as "chrome.dll", "debug.log", and others. Thus, only 10% of the users do not have the file "Chrome.exe" in the directory (for example, it may have been accidentally deleted). The files are stable and they have an identical occurrence. Therefore, the files may be formed into a single group.

In another aspect, the occurrence of a file name denotes the number of times a file with that name is run in the indicated group.

It should be noted that, in the general case, different files may have the same file name, that is, files having different hash sums may have the same file name (for example, different versions of the same application may have different hash sums but the same file name). These scenario is also be considered when determining the occurrence of a file name.

In one aspect, the group generator 111 is further used for generating at least one group of files (hereinafter "group") from at least two files with stable names, wherein the at least two files are components of a same application. The generated groups are kept (stored) in the database of files 115.

In one aspect, the dominant developer identifier 112 is used for identifying a dominant developer for each group. The dominant developer of a particular group is the developer whose private key was (or several private keys were) used to sign at least one file of the particular group. In one aspect, the dominant developer of a group is at least one developer whose private key was used to sign the files of the group for which the frequency of running the application files by users exceeds a given threshold (for example, those files are run by 80% of the users of the group). Thus, the group is generated for an aggregate of files pertaining to the same application. The dominant developer is identified by the most often run files of the group signed by the private key of the dominant developer, wherein the most often run files of the group are selected from among all the files of the group.

For example, the developer Microsoft may have several pairs of public and private keys for signing files. Each public key corresponds to a public key certificate of the developer (i.e., Microsoft). For different pairs of public/private keys, the certificates may have different values of the "subject" data field—Microsoft Corporation, Microsoft Windows and so forth. However, all those certificates belong to the same developer, Microsoft.

In one aspect, the determination as to whether or not the certificate belongs to the same developer may be based on an analysis of a field of the certificate. For instance, the determination may be based on the "subject" data field of the certificate. In another aspect, the determination as to whether or the certificate belongs to the same developer may be made using a previously generated list of developer certificates. In one aspect, the previously generated list of developers may be stored in a database (not shown in the figure) located in the cloud infrastructure 110.

In one aspect, the group generator 111 is used for generating a group of files, wherein the occurrence of the path and names of the files satisfy a predetermined level of precision (for example, a precision of 30%). In another aspect, the group is generated while taking into account the occurrence of the path and the names of the files during a predetermined window of time (such as 1 day). The files may be present either in a same directory or in different directories.

After the group of files is generated, the trust level identifier 113 determines trust levels for all files of the group. In one aspect, the trust levels for all the files of the group are determined based on at least one of: verdicts rendered by outside services to the files of the group; verdicts rendered by outside services to at least one file on devices of users that do not belong to the group, wherein the at least one file is signed with a private key of a dominant developer associated with the group of files; and verdicts rendered by outside services to files of another group, the another group also being associated with the dominant developer associated with the group of files, wherein a frequency of running applications developed by the dominant developer among the users exceeds a predetermined threshold.

In one aspect, the outside service comprises a protection system 101 of a computing device 120, in particular, the modules of the protection system 101. In another aspect, the outside service comprises a cloud infrastructure 110 and, in particular, the modules of the cloud infrastructure. In one aspect, the verdicts of the files may be stored on the computing device 120 of the user 100, e.g., in the local virus database 104. In another aspect, the verdicts of the files may be stored in the cloud infrastructure 110, e.g., in the virus database 116.

In one aspect, the trust level identifier 113 saves (i.e., stores) the determined trust levels of the files in a database of trust levels 114. In one aspect, the data stored in the database of trust levels 114 is backed up in a local database of trust levels 102 periodically or as updated. Furthermore, in one aspect, the local database of trust levels 102 stores only the data needed by a particular computing device 120 of the user. That is, a given local database of trust levels might not save all of the data stored in the database of trust levels 114, rather only the data needed by the particular computing device of the user 120. For example, the trust levels stored in the local database of trust levels 102 may be only for those files which are stored on the particular computing device 120 of the user 100. The trust level, like the verdict of the protection system 101, may serve as an indicator for the protection system 101, when the protection system 101 is making a determination on actions to be taken for the file. In other words, in one aspect, the protection system 101 determines actions to be taken for the file based on the verdict for the file and/or the trust level of the file.

In one aspect, the trust level of the file and the verdict for the file, assume at least one of the following values (but not limited to these), in worsening order:
 trusted, wherein a running of the file on a computing device of the user is permitted;
 unclassified, wherein a running of the file on a computing device of the user is determined according to settings for unclassified files;
 intermediate, wherein a running of the file on a computing device of the user is determined according to settings for intermediate files; and
 untrusted, wherein a running of the file on a computing device of the user is forbidden.

In one aspect, the protection system 101 prevents the running of files having an untrusted trust level. In one aspect, when the protection system 101 prevents the running of the file having an untrusted trust level, the protection system 101 further takes at least one of the following actions: removes the file, or quarantines the file. In one aspect, files that are quarantined are placed in a protected repository from which files are forbidden to be run. In one aspect, when a file has an intermediate trust level, the protection system 101 requests a confirmation from a user in regards to whether or not to run the file. For example, settings of the protection system 101 may include indications as to an appropriate action to be taken when the file has an intermediate trust level. In one aspect, a file which is trusted is run without the need for a confirmation from the user. In one aspect, when a file has an unclassified trust level, the protection system 101 takes an action on the file according to settings of the protection system 101. For example, if the settings of the protection system 101 establish a prohibition by default (default deny), the file will run only when it is deemed as being a trusted files (e.g., using whitelists, described below). In contrast, if files are allowed to run by default, running is allowed for all files except for the ones deemed as being untrusted (i.e., untrusted files may be stored in a blacklist, as described below). It is noted that other variations of settings of the protection system 101 are also allowed. For example, the settings of the protection system 101 may have an option to forbid the running of intermediate files—in this case, the running of intermediate files will be forbidden, while the running of unclassified files will be allowed. In yet another example, the running of intermediate files can be performed in so-called "limited mode", wherein the protection system 101 monitors the execution of the intermediate file, and in the event that forbidden actions are performed (such as suspicious network activity, saving of files to disk, changing of the registry, and so forth), the protection system 101 requests for confirmation from the user of the device. For instance, the confirmation may be to determine whether to continue running the file, terminate, and so on.

It should be noted that during the antivirus scan of a file, the protection system 101 first accesses the local database of trust levels 102 or the database of trust levels 114 in the cloud infrastructure 110. In one aspect, the cloud infrastructure 110 is the location at which the trust level of the file is determined, e.g., using the hash sum, and stored in the database of trust levels 114. Depending on the trust level of the file, the protection system 101 carries out the processing of that file (i.e., allows or forbids the running of codes of the file, removes or places the file in quarantine, etc.). In one aspect, when the trust level of the file has not been determined, the protection system 101 performs an antivirus scanning of the file using: modules of the protection system 101 (e.g., antivirus programs) and a local virus database 104. It should also be noted that the trust level of the file, as determined using the method of the present disclosure, may then be used by modules of the cloud infrastructure 110, for instance, to alter verdicts of corresponding modules of the cloud infrastructure 110.

In one aspect, the whitelists contain information about known trusted files. The blacklists contain information about known untrusted files. In one aspect, the whitelists and blacklists may be contained in a virus database 116 of the cloud infrastructure 110 and/or the local virus database 104. In another aspect, the whitelists and blacklists may be kept in separate databases (not indicated in the figure).

In one aspect, the method of the present disclosure determines that he dominant developer of a group cannot be identified. For example, suppose the dominant developer is the developer whose private key was used to sign the files of the group, wherein the developer also must have a frequency of running of files among users that is greater than a predetermined threshold. Then, when there is no developer whose private key was used to sign the files of the group with a run frequency among users being greater than the predetermined threshold is not found, the method of the present disclosure concludes that there is no dominant developer. In this case, the trust level identifier 113 is used for determining the trust level of the files of the group based on verdicts by outside services on the files of the group for which the run frequency among the users is greater than a given threshold.

In a particular aspect, the verdicts by the outside services are assigned to at least one of:
    a) files signed using the private key of the dominant developer of the group;
    b) files having a stable file name and belonging to groups of the dominant developer;
    c) files having stable names in an indicated group;
    d) files having an indicated stable name on an indicated path;
    e) files with a stable name, stored on an indicated path from a list of trusted paths, the indicated file being stored on the indicated path with the indicated name and exceeding a given threshold of a portion of users among whom the file is present; and
    f) the file;
wherein, the outside services comprise at least: modules of the protection system 101 or modules of the cloud infrastructure 110.

In one aspect, the list of trusted paths may be stored in a database of files 115 of the cloud infrastructure 110.

It should be noted that, depending on the aspect of the present disclosure used for determining the trust level of the files, only one of the verdicts a)-f) may be used, or any combination of verdicts a)-f) may be used. It should also be noted that the method of the present disclosure is not limited to the indicated verdicts—in addition, any methods known in the relevant art(s) may be used to determine the verdicts by outside services. Moreover, for the aspects in which no dominant developer is identified or the dominant developer has not been identified, only the verdicts described in items c)-f) are used to determine the trust level of a file of a group.

In another aspect, the trust level of the file of the group is determined as being the worst value of the verdicts of outside services. For example, if a combination of the verdicts b)-f) is being used, and the verdicts b)-e) indicate that the file is trusted, while verdict f) indicates that the file is untrusted (for example, the file was recently found to be malicious by an expert system), in this instance, the trust level of the file of the group is determined as being untrusted.

In yet another aspect, the trust level of the files of the group is determined by weighting the verdicts of the outside services. For example, verdict a) may have a greater weight than verdict b); and, if verdict b) indicates that the file is trusted, while verdict a) indicates that the file is untrusted, then the trust level of the file is determined as being untrusted, based on verdict a) having greater weight.

In yet another aspect, a file is determined as being a trusted file if, by using the indicated methods (combination of methods), the determined number of untrusted, unclassified, and intermediate files is not greater than a given threshold (for example, not greater than 1%), wherein the trusted trust level was determined using at least one of the methods of the combination of methods, and an occurrence of the file on computing devices of the users reaches or exceeds a predetermined threshold (for example, greater than 80%).

In yet another aspect, a file is determined as being trusted when the number of untrusted, unclassified and intermediate verdicts is below a predetermined threshold (for example, not greater than 1%), wherein at least one trusted verdict was determined, and an occurrence of the file on computing devices of the users reaches or exceeds a predetermined threshold threshold (for example, 80%).

In yet another aspect, the trust level of a file is changed in accordance with a verdict for the file from outside services, when the verdict from the outside services changes. For example, if the verdict for the file has changed from the protection system 101 of the user computing devices 120 or the cloud infrastructure 110, or in the antivirus database 114, or in the white or black lists, the trust level of the file is updated in accordance with the change in the verdict. For example, hackers after launching a new malicious file might not execute the malicious functionality for some time, so that the largest possible number of users will download the malicious file. As a result, the file may initially be recognized as trusted or intermediate. Then, sometime later (for example, a month later), a command may be dispatched from the command center of the hackers to activate the malicious functionality of the file. After the activation of the malicious functionality, certain expert systems or analysts of an antivirus company discovers that the file is malicious. As a result, in one aspect, the trust level of the file of the group will be changed to untrusted.

In yet another aspect, the trust level of an untrusted file is changed to unclassified if, in the course of a given time (such as one month), the verdict for the file from outside services has not changed, yet the file has been run on the devices of the user at least once. In this way, it is possible to reduce the number of false positives if, for example, a file which is not untrusted was wrongly classified as untrusted one time, but then this trust level was not confirmed.

It should be noted that, in other aspects, other verdicts may also be used in determining the trust level of a file, in particular machine learning may be used to determine the verdicts (for example, decision-making trees, artificial neural nets, the method of support vectors, and so on). Thus, for example, verdicts a)-f) may be combined using a decision-making tree to determine trust levels of files.

It should also be noted that a hacker might replace a trusted file with a malicious (i.e., an untrusted) file among some users. But then among some users a trusted file will be stored on the indicated path and with the indicated name, while there will be an untrusted file among other users. Thus, in one aspect, the resulting trust level of a file will be trusted if a run frequency among the users of the file is greater than a first threshold (such as 90%), and the trust level of the file will be intermediate if the run frequency is below the first threshold and above a second threshold, and the trust level of the file will be untrusted if the run frequency is below the second threshold (such as 80%).

In one aspect, at least one of the following is used to determine whether files belong to a same application: a registry, a structure of file systems of the files being compared, time stamps of the files (indicating that the files were created at the same time and, most likely, belong to the same application), and occurrences of paths to the files—the portion of the users among whom that path is present. That is, if the files belong to different paths with close occurrence (for example, more than 60%) and close time stamps for their creation (for example, they were created with a difference of 10 seconds), then these files determined as belonging to the same application.

In yet another aspect, a group is formed in such a way that the files are stored in the same directory at least among a given number of computing devices of the users. In another aspect, when generating the group, if the files of that subdirectory have been run on the given number of computing devices of the users, the method includes files from at least one subdirectory of the directory.

Figure 2:
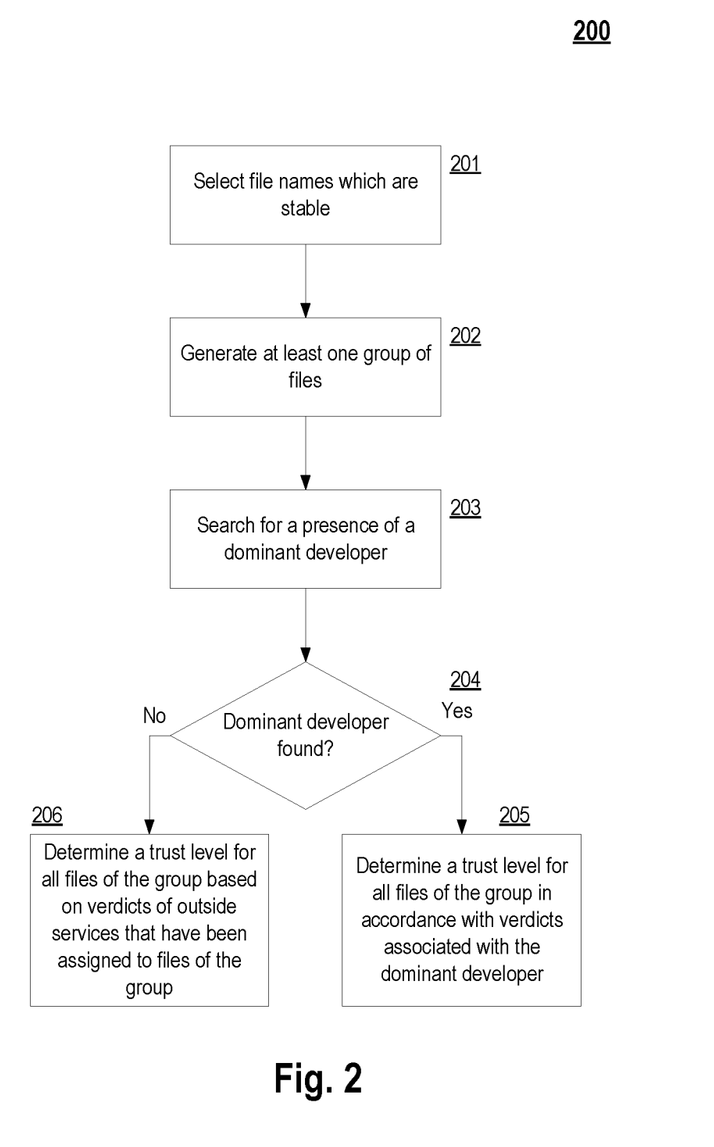
FIG. 2 illustrates a method for determining a trust level of a file of an application in accordance with aspect of the present disclosure.

FIG. 2 illustrates a method 200 for determining a trust level of a file of an application in accordance with aspect of the present disclosure. The method 200 may be implemented on a system that comprises any number of devices, e.g., a system 100.

In step 201, method 200 selects file names which are stable.

In step 202, method 200 generates, by a group generator, at least one group of files (hereinafter, a group) from at least two files of the selected file names, the at least two files being components of a same application.

In step 203, method 200 searches for a presence of a dominant developer such that at least one private key of the dominant developer has been used to sign at least one file of the group of files that is generated.

In step 204, method 200 determines whether a dominant developer is found. When a dominant developer is found, method 200 proceeds to step 205. Otherwise, the method proceeds to step 206.

In step 205, method 200 determines a trust level for all files of the group in accordance with verdicts associated with the dominant developer. In one aspect, the trust levels are determined in accordance with verdicts associated with the dominant developer based on: verdicts of outside services which have been assigned to the files of the group. In one aspect, the trust levels are determined in accordance with verdicts associated with the dominant developer based on: verdicts of outside services which have been assigned to at least one file on a computing device of a user which does not belong to the group and is signed with the private key of the dominant developer. In one aspect, the trust levels are determined in accordance with verdicts associated with the dominant developer based on: verdicts of outside services that have been assigned to files of another group of the dominant developer, the files of the another group having a run frequency among users that is greater than a predetermined threshold for a run frequency.

In step 206, method 200 determines the trust level of the files of the group based on verdict of outside services that have been assigned to the files of the group. It should be noted that steps 203-204 are performed in one aspect. In another aspect, after generating the group in step 202, the trust level of the files of the group is determined without using a dominant developer of the group as described in step 206.

In one aspect, the trust levels are determined in accordance with verdicts associated with the dominant developer based on: verdicts of outside services which have been assigned to the files of the group.

In one aspect, the trust levels are determined in accordance with verdicts associated with the dominant developer based on: verdicts of outside services which have been assigned to at least one file on a computing device of a user which does not belong to the group and is signed with the private key of the dominant developer.

In one aspect, the trust levels are determined in accordance with verdicts associated with the dominant developer based on: verdicts of outside services that have been assigned to files of another group of the dominant developer, the files of the another group having a run frequency among users that is greater than a predetermined threshold for a run frequency.

In one aspect, the outside services comprise at least one of: at least one protection system of at least one computing device on which the files are stored, and any number of servers of a cloud infrastructure with which the at least one computing device is communicatively coupled.

In one aspect, the cloud infrastructure aggregates and stores data received from all of the computing device, wherein data is collected by a protection system of a given computing device based on confidentiality settings selected by a user of the given computing device.

In one aspect, when the selected confidentiality settings indicates refraining from data collection, data on a local database of files of the computing device for which the refraining is selected includes information only on files having a predetermined characteristic.

In one aspect, the predetermined characteristic include at least one of: the files being executable, the files being stored along a predetermined path, and the files having a predetermined set of extensions.

In one aspect, the file name is stable when, among all users having previously indicated path on their respective computing devices, an occurrence of the file name for all the computing devices lies within a predetermined vicinity of the file name most often encountered among all the computing devices of all of the users having the indicated path.

In one aspect, the trust level of a file and a verdict for the file, assume at least one of the following values, in worsening order: trusted, wherein a running of the file on a computing device of the user is permitted; unclassified, wherein a running of the file on a computing device of the user is determined according to settings for unclassified files; intermediate, wherein a running of the file on a computing device of the user is determined according to settings for intermediate files; and untrusted, wherein a running of the file on a computing device of the user is forbidden.

In one aspect, when the file has the untrusted trust level, the method further comprises taking at least one of the following actions: removing the file and quarantining the file, wherein files that are quarantined are placed in a protected repository of the computing device from which files are forbidden to be run.

In one aspect, when the file has the intermediate trust level, the method further comprises: requesting a confirmation from a user in regards to whether or not to run the file.

In one aspect, when the file has the unclassified trust level, the settings for the unclassified files indicate at least one of: a prohibition by default of the file from being run unless the file is on a whitelist, an allowing by default of the file for being run unless the file is on a blacklist.

Thus, the present method 200 and system 100 improve the quality of classification of trusted software, and improve the quality of classification of trusted software.

Figure 3:
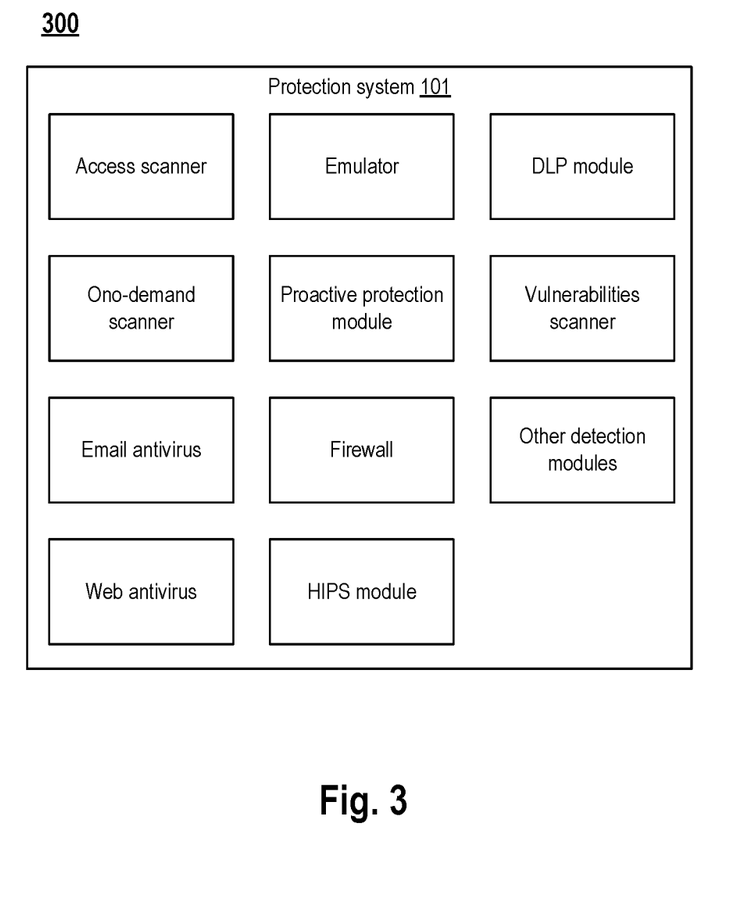
FIG. 3 illustrates an exemplary protection system of a computing device for determining a trust level of a file of an application in accordance with aspects of the present disclosure.

FIG. 3 illustrates an example 300 of a protection system 101 of a computing device 120 for determining a trust level of a file of an application in accordance with aspects of the present disclosure. The protection system 101 may contain modules designed to provide information security of the computing device of the user 120: an access scanner, an on-demand scanner, an email antivirus, a web antivirus, a behavioral analyzer (a proactive protection module), a HIPS (Host Intrusion Prevention System) module, a DLP (data loss prevention) module, a vulnerabilities scanner, an emulator, a firewall, and others. In one aspect, these modules may be part of the protection system 101. In another aspect, these modules may be realized as separate program components.

The access scanner contains a functionality for detecting malicious activity of all files being opened, run, and saved on the computing device of the user. The on-demand scanner differs from the access scanner in that it scans files and directories specified by the user on demand of the user.

The email antivirus is needed to check incoming and outgoing email for containing of malicious files. The web antivirus serves for preventing the execution of malicious code which may be contained on web sites visited by the user, and also for blocking the opening of web sites. The HIPS module serves for detecting unwanted and malicious program activity and blocking it at the moment of execution. The DLP module serves for detecting and preventing loss of confidential data from a computer or network. The vulnerabilities scanner is needed to detect vulnerabilities on the computing device of the user 120 (for example, certain components of the protection system 101 have been switched off, obsolete virus databases, a network port has been closed, etc.) The firewall provides monitoring and filtering of network traffic in accordance with specified rules. The operations of the emulator consist simulating the host system during the execution of codes in the emulator. The behavioral analyzer uses behavioral rules to detect the behavior of files being executed and to classify them by trust level—during the execution of a file, the behavioral analyzer searches the log of registered calls for at least records on API function calls corresponding to the behavioral rules in a threats database. In one aspect, the call log and the threats database are stored on the computing device 120 of the user.

A behavioral rule includes the record of a call of at least one API function and a verdict (for example, a computer virus, an Internet worm, a Trojan horse program or conditionally unwanted software) in the event of this rule being fulfilled.

A behavioral rule also corresponds to a verdict which is pronounced when this rule is fulfilled—that is, the most likely category of malicious or unwanted software corresponding to that rule. The verdict may be as follows, for example: computer virus, Internet worm, Trojan horse program or conditionally unwanted software.

These modules upon detecting malicious software (suspicious behavior, spam and other signs of a computer threat) create a corresponding message (which may afterwards be transformed into a verdict of the protection system 101) informing the protection system of the detected threat and the need to take action to eliminate the threat (such as removal or alteration of the file, forbidding its execution, and so forth). In one aspect, the very module having detected the malicious software may perform the actions to eliminate the threat. In another example, the verdict may be an inaccurate or a trial verdict (since the verdict may produce false positives)—in this case, the protection system may not take an action to eliminate the threat, but instead pass on the message to the cloud infrastructure 110. In one aspect, malicious software includes categories like the trust levels (the verdict corresponds to the category)—untrusted, trusted, intermediate, unclassified. In yet another aspect, the categories may be as follows: malicious software and conditionally unwanted software. Malicious software may have subcategories—viruses, worms, Trojan horses, packers, malicious utilities. Conditionally unwanted software may include advertising software (adware), software involving pornographic content (pornware), legal software whose use may cause harm to a computer (riskware) and others.

Figure 4:
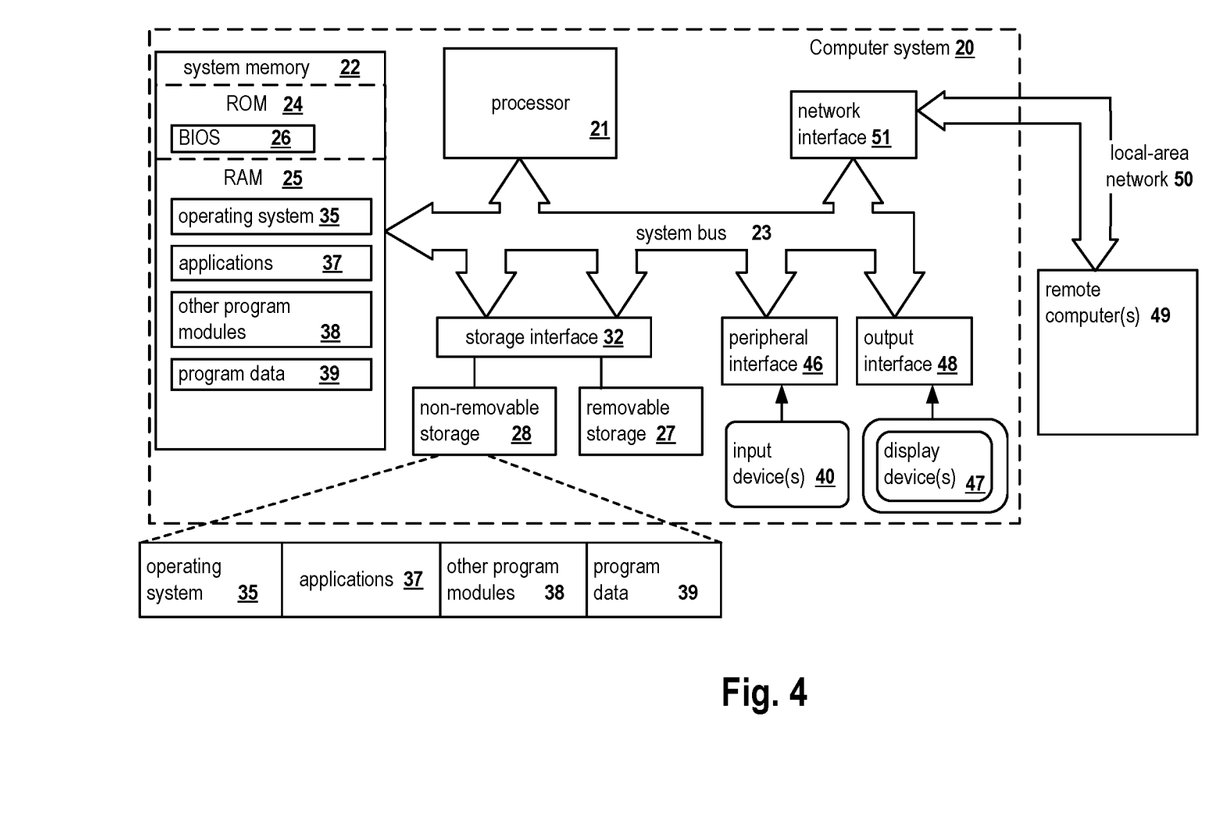
FIG. 4 presents an example of a general purpose computer system on which aspects of the present disclosure can be implemented.

FIG. 4 is a block diagram illustrating a computer system 20 on which aspects of systems and methods for determining a trust level of a file, may be implemented in accordance with exemplary aspects. It should be noted that the computer system 20 can correspond to a virtual security device 102, for example, as described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for determining a trust level of a file, the method comprising:
   selecting, from a computing system, file names which are stable;
   generating using a processor of the computing system, at least one group of files from at least two files of the selected file names, the at least two files being components of a same application;
   searching for a presence of a dominant developer such that at least one private key of the dominant developer has been used to sign at least one file of the group of files that is generated;
   when a dominant developer is found, determining trust levels for all files of the group of files, wherein a trust level for each file of the group of files is determined in accordance with verdicts associated with the dominant developer based on at least verdicts of outside services that have been assigned to et another group of files associated with the dominant developer; and
   when the dominant developer is not found, determining trust levels for all the files of the group of files, wherein a trust level for each file of the group of files is determined based on verdicts of outside services that have been assigned to the files of the group, the outside services including any number of servers of a cloud infrastructure with which a computing device is communicatively coupled.

2. The method of claim 1, wherein the trust levels are determined in accordance with verdicts associated with the dominant developer based on: verdicts of outside services which have been assigned to the files of the group.

3. The method of claim 1, wherein the trust levels are determined in accordance with verdicts associated with the dominant developer further based on: verdicts of outside services which have been assigned to at least one file on a computing device of a user which does not belong to the group and is signed with the private key of the dominant developer.

4. The method of claim 1, wherein the files of the another group have a run frequency among users that is greater than a predetermined threshold for a run frequency.

5. The method of claim 1, wherein the outside services further comprise at least one protection system of at least one computing device on which the files are stored.

6. The method of claim 5, wherein the cloud infrastructure aggregates and stores data received from all of the computing devices, wherein data is collected by a protection system of a given computing device based on confidentiality settings selected by a user of the given computing device.

7. The method of claim 6, wherein, when the selected confidentiality settings indicates refraining from data collection, data on a local database of files of the computing device for which the refraining is selected includes information only on files having a predetermined characteristic, the predetermined characteristic including at least one of: the files being executable, the files being stored along a predetermined path, and the files having a predetermined set of extensions.

8. A system for determining a trust level of a file, comprising:
   at least one processor configured to:
      select file names which are stable;
      generate at least one group of files from at least two files of the selected file names, the at least two files being components of a same application;

search for a presence of a dominant developer such that at least one private key of the dominant developer has been used to sign at least one file of the group of files that is generated;

when a dominant developer is found, determine trust levels for all files of the group of files, wherein a trust level for each file of the group of files is determined in accordance with verdicts associated with the dominant developer based on at least verdicts of outside services that have been assigned to another group of files associated with the dominant developer; and when the dominant developer is not found, determine trust levels for all the files of the group of files, wherein a trust level for each file of the group of files is determined based on verdicts of outside services that have been assigned to the files of the group, the outside services including any number of servers of a cloud infrastructure with which a computing device is communicatively coupled.

9. The system of claim 8, wherein the trust levels are determined in accordance with verdicts associated with the dominant developer based on: verdicts of outside services which have been assigned to the files of the group.

10. The system of claim 8, wherein the trust levels are determined in accordance with verdicts associated with the dominant developer further based on: verdicts of outside services which have been assigned to at least one file on a computing device of a user which does not belong to the group and is signed with the private key of the dominant developer.

11. The system of claim 8, wherein the files of the another group have a run frequency among users that is greater than a predetermined threshold for a run frequency.

12. The system of claim 8, wherein the outside services further comprise at least one protection system of at least one computing device on which the files are stored.

13. The system of claim 12, wherein the cloud infrastructure aggregates and stores data received from all of the computing devices, wherein data is collected by a protection system of a given computing device based on confidentiality settings selected by a user of the given computing device.

14. The system of claim 13, wherein, when the selected confidentiality settings indicates refraining from data collection, data on a local database of files of the computing device for which the refraining is selected includes information only on files having a predetermined characteristic, the predetermined characteristic including at least one of: the files being executable, the files being stored along a predetermined path, and the files having a predetermined set of extensions.

15. A non-transitory computer readable medium storing thereon computer executable instructions for determining a trust level of a file, including instructions for:

selecting file names which are stable;

generating at least one group of files from at least two files of the selected file names, the at least two files being components of a same application;

searching for a presence of a dominant developer such that at least one private key of the dominant developer has been used to sign at least one file of the group of files that is generated;

when a dominant developer is found, determining trust levels for all files of the group of files, wherein a trust level for each file of the group of files is determined in accordance with verdicts associated with the dominant developer based on at least verdicts of outside services that have been assigned to another group of files associated with the dominant developer; and when the dominant developer is not found, determining trust levels for all the files of the group of files, wherein a trust level for each file of the group of files is determined based on verdicts of outside services that have been assigned to the files of the group, the outside services including any number of servers of a cloud infrastructure with which a computing device is communicatively coupled.

16. The non-transitory computer readable medium of claim 15, wherein the trust levels are determined in accordance with verdicts associated with the dominant developer based on: verdicts of outside services which have been assigned to the files of the group.

17. The non-transitory computer readable medium of claim 15, wherein the trust levels are determined in accordance with verdicts associated with the dominant developer further based on: verdicts of outside services which have been assigned to at least one file on a computing device of a user which does not belong to the group and is signed with the private key of the dominant developer.

18. The non-transitory computer readable medium of claim 15, wherein the files of the another group have a run frequency among users that is greater than a predetermined threshold for a run frequency.

19. The non-transitory computer readable medium of claim 15, wherein the outside services further comprise at least one protection system of at least one computing device on which the files are stored.

20. The non-transitory computer readable medium of claim 19, wherein the cloud infrastructure aggregates and stores data received from all of the computing devices, wherein data is collected by a protection system of a given computing device based on confidentiality settings selected by a user of the given computing device.

21. The non-transitory computer readable medium of claim 20, wherein, when the selected confidentiality settings indicates refraining from data collection, data on a local database of files of the computing device for which the refraining is selected includes information only on files having a predetermined characteristic, the predetermined characteristic including at least one of: the files being executable, the files being stored along a predetermined path, and the files having a predetermined set of extensions.

* * * * *